United States Patent
Tanida et al.

(10) Patent No.: US 10,635,370 B2
(45) Date of Patent: Apr. 28, 2020

(54) IMAGE FORMING APPARATUS THAT ACQUIRES DATA FROM AN ACTIVITY AMOUNT METER

(71) Applicants: TANITA CORPORATION, Tokyo (JP); FUJI XEROX CO., LTD., Tokyo (JP)

(72) Inventors: Senri Tanida, Tokyo (JP); Sotaro Sakashita, Tokyo (JP); Toshio Fuji, Yokohama (JP); Hiroki Iida, Yokohama (JP); Satoshi Yamamoto, Yokohama (JP)

(73) Assignees: TANITA CORPORATION, Tokyo (JP); FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/472,481

(22) Filed: Mar. 29, 2017

(65) Prior Publication Data
US 2017/0286032 A1    Oct. 5, 2017

(30) Foreign Application Priority Data

Mar. 31, 2016  (JP) ................... 2016-071351
Mar. 31, 2016  (JP) ................... 2016-071352
Mar. 31, 2016  (JP) ................... 2016-071353

(51) Int. Cl.
*G06F 3/12* (2006.01)
*H04N 1/00* (2006.01)

(52) U.S. Cl.
CPC ............ *G06F 3/1273* (2013.01); *G06F 3/121* (2013.01); *G06F 3/1222* (2013.01); *G06F 3/1234* (2013.01); *G06F 3/1286* (2013.01); *H04N 1/00342* (2013.01); *H04N 1/00474* (2013.01); *H04N 1/00854* (2013.01); *H04N 1/00875* (2013.01); *H04N 2201/0094* (2013.01)

(58) Field of Classification Search
CPC .... G06F 3/1273; G06F 3/1222; G06F 3/1234; G06F 3/121; G06F 3/1286; G06F 21/34;
(Continued)

(56) References Cited

U.S. PATENT DOCUMENTS

2003/0065957 A1*  4/2003  Tsuji ................... G06Q 20/341
                                                      726/21
2004/0037121 A1*  2/2004  Shinriki ............... G06F 21/445
                                                      365/200

(Continued)

FOREIGN PATENT DOCUMENTS

CN       102265295 A       11/2011
CN       103616034 A       3/2014
(Continued)

OTHER PUBLICATIONS

Communication dated Sep. 20, 2019 issued by the State Intellectual Property Office of P.R. China in counterpart Chinese Application No. 201710208395.8.

*Primary Examiner* — Juan M Guillermety
(74) *Attorney, Agent, or Firm* — Sughrue Mion, PLLC

(57) ABSTRACT

An image forming apparatus includes a reading unit that reads data stored in an activity amount meter, at least one of an image forming unit that forms an image on a recording medium and an image reading unit that reads the image, a display unit that displays an option to be selected such that the display unit receives a use instruction of a function that is selected, and a sending unit that sends the data stored in the activity amount meter and read by the reading unit. The display unit receives the use instruction even when the sending unit is sending the data stored in the activity amount meter and read by the reading unit.

19 Claims, 17 Drawing Sheets

(58) Field of Classification Search
CPC .......... G06F 21/608; G06F 3/1292; G06F
2221/2135; G06F 21/31; G06F 2211/003;
G06F 21/44; G06F 21/45; G06F 21/30;
G06F 21/445; G06F 21/33; G06F
2212/177; H04N 1/00342; H04N
1/00474; H04N 1/00854; H04N 1/00875;
H04N 2201/0094; H04N 1/4413; H04N
1/4426; H04N 2201/3205; H04N
2201/0091; H04N 2201/3236; H04N
2201/324; H04N 21/4753; H04N
21/25875; H04N 21/25825; H04L 67/125;
H04L 29/06755; H04L 29/06816; H04L
29/12518; H04L 63/083; H04L 9/32;
H04L 9/006; H04L 63/0823; H04L
9/3226; H04L 9/3228; H04L 63/0853;
G06Q 20/3674; G06Q 20/388; G06Q
20/4093; G06Q 20/40975; G06Q 20/409;
G06Q 20/4097; G03G 21/1892; G03G
2215/0092; G03G 15/5066; G05B
2219/24163; G05B 2219/36104; G05B
2219/13156; G05B 2219/23342; G07B
2017/00774; G11B 19/122; G03H 1/0011;
G07D 7/0032; G06K 19/10; H04W
12/06; H04W 12/00; H04M 2203/6063;
H04M 2203/6072; H04Q 2213/13095;
H04Q 2213/13515
See application file for complete search history.

(56) References Cited

U.S. PATENT DOCUMENTS

| | | | | |
|---|---|---|---|---|
| 2007/0026843 A1* | 2/2007 | Choi | ............... | H04L 63/0876 455/411 |
| 2007/0265138 A1* | 11/2007 | Ashby | ............... | G16H 20/30 482/8 |
| 2008/0114953 A1* | 5/2008 | Takatsuka | ............... | G11B 27/034 711/162 |
| 2010/0257588 A1* | 10/2010 | Urien | ............... | H04L 9/321 726/3 |
| 2011/0226035 A1 | 9/2011 | Date | | |
| 2011/0231152 A1 | 9/2011 | Kawabe | | |
| 2011/0238326 A1 | 9/2011 | Takahashi | | |
| 2011/0251500 A1 | 10/2011 | Sawanoi | | |
| 2011/0251501 A1 | 10/2011 | Sawanoi | | |
| 2011/0257538 A1 | 10/2011 | Sawanoi | | |
| 2011/0257539 A1 | 10/2011 | Sawanoi et al. | | |
| 2011/0257540 A1 | 10/2011 | Sawanoi et al. | | |
| 2013/0141747 A1* | 6/2013 | Oba | ............... | G06F 3/1292 358/1.14 |
| 2013/0302022 A1* | 11/2013 | Oyama | ............... | G03B 15/00 396/57 |
| 2013/0321847 A1* | 12/2013 | Eun | ............... | H04N 1/00891 358/1.14 |
| 2015/0164238 A1* | 6/2015 | Benson | ............... | G16H 50/30 340/540 |
| 2016/0062713 A1 | 3/2016 | Oshima | | |
| 2016/0213296 A1* | 7/2016 | Kikuchi | ............... | G06Q 50/22 |
| 2016/0269384 A1* | 9/2016 | Suga | ............... | H04N 1/4413 |
| 2017/0011210 A1* | 1/2017 | Cheong | ............... | G06F 21/32 |
| 2017/0013464 A1* | 1/2017 | Fish | ............... | H04W 12/12 |

FOREIGN PATENT DOCUMENTS

| | | |
|---|---|---|
| CN | 103932696 A | 7/2014 |
| CN | 203709361 U | 7/2014 |
| CN | 105205320 A | 12/2015 |
| JP | 2014-223170 A | 12/2014 |
| JP | 2015-54002 A | 3/2015 |
| JP | 2016-20933 A | 2/2016 |

* cited by examiner

IMAGE FORMING APPARATUS THAT ACQUIRES DATA FROM AN ACTIVITY AMOUNT METER

CROSS-REFERENCE TO RELATED APPLICATIONS

This application is based on and claims priority under 35 USC § 119 from Japanese Patent Application No. 2016-071351, filed on Mar. 31, 2016, Japanese Patent Application No. 2016-071352, filed on Mar. 31, 2016, and Japanese Patent Application No. 2016-071353, filed on Mar. 31, 2016.

BACKGROUND

Technical Field

The present invention relates to an image forming apparatus, a non-transitory computer readable medium, and an activity amount meter system.

SUMMARY

According to an aspect of the invention, there is provided an image forming apparatus including: a reading unit that reads data stored in an activity amount meter; at least one of an image forming unit that forms an image on a recording medium and an image reading unit that reads the image; a display unit that displays an option to be selected such that the display unit receives a use instruction of a function that is selected; and a sending unit that sends the data stored in the activity amount meter and read by the reading unit, wherein the display unit receives the use instruction even when the sending unit is sending the data stored in the activity amount meter and read by the reading unit.

BRIEF DESCRIPTION OF DRAWINGS

Exemplary embodiments of the present invention will be described in detail based on the following figures, wherein.

DETAILED DESCRIPTION

Next, the exemplary embodiments of the invention will be described in detail with reference to the drawings.

Figure 1:
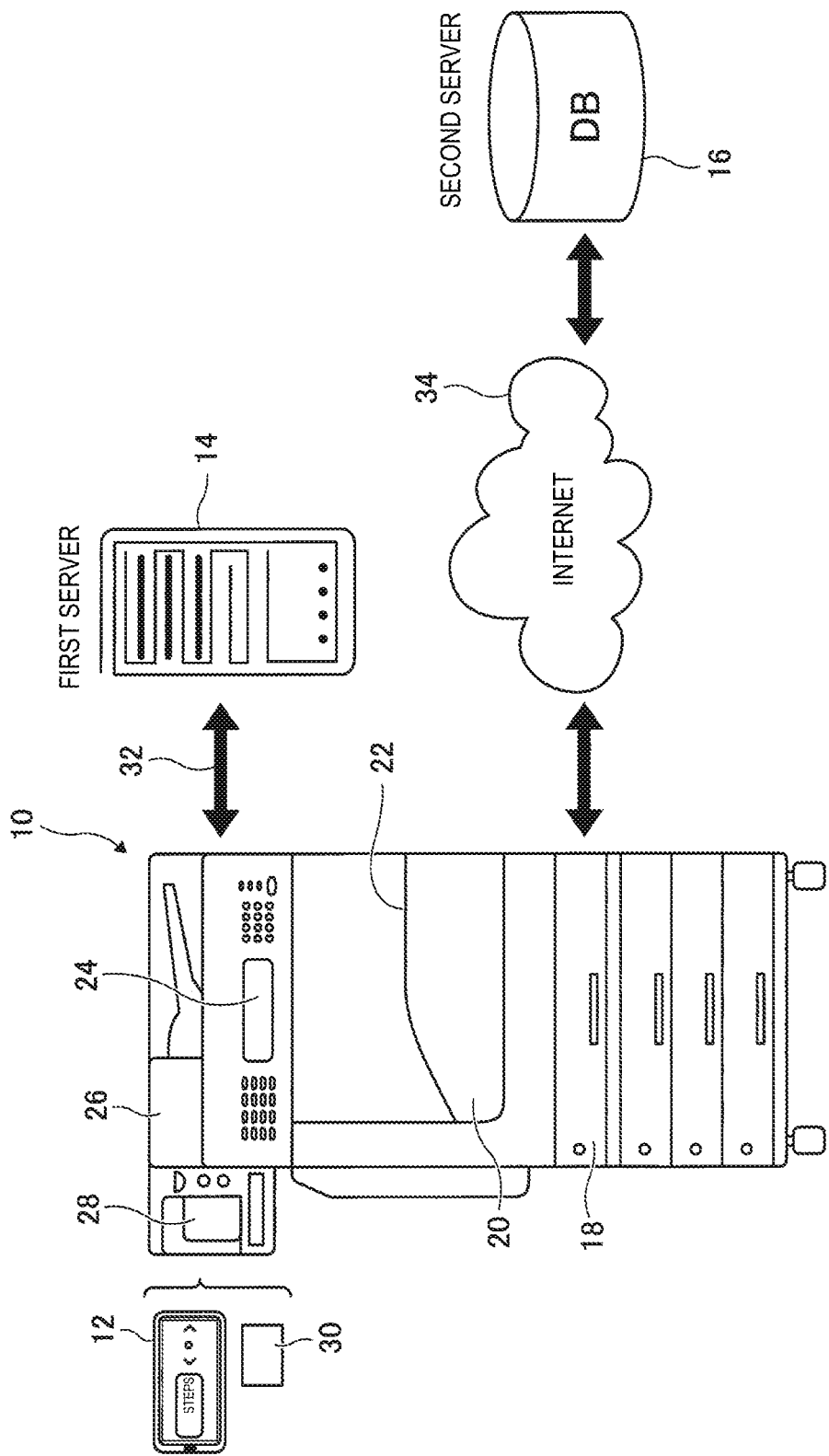
FIG. 1 is a system view illustrating a configuration of an activity amount meter system according to an exemplary embodiment of the invention.

FIG. 1 is a system view illustrating a configuration of an activity amount meter system according to the exemplary embodiment of the invention.

The activity amount meter system according to the exemplary embodiment of the invention includes an image forming apparatus 10, an activity amount meter 12, a first server 14, and a second server 16.

The image forming apparatus 10 includes a recording medium accommodating portion 18 in which recording mediums (paper sheets) having various types of sizes are accommodated. In addition, the image forming apparatus 10 includes an image forming portion 20, and forms an image on the recording medium transported from the recording medium accommodating portion 18. The recording medium on which an image is formed by the image forming portion 20 is output to a recording medium output portion 22.

In addition, a user interface 24 is provided on the image forming apparatus 10. The user interface 24 configures a display unit, and displays functions of the image forming apparatus 10 as options (icons), for example, by a touch panel method, and when a user touches the options, the touched option is received as a functional instruction of the user. Furthermore, an auto document feeder 26 is provided above the user interface 24. The auto document feeder 26 sends documents one by one, and reads a document image.

A card reader 28 which is a reading unit is provided, for example, at an upper part of the image forming apparatus 10. The card reader 28 is, for example, a near field communication (NFC) method. The card reader 28 reads data stored in the activity amount meter 12 or an IC card 30 by holding the activity amount meter 12 which will be described later or the IC card 30, such as an employee identification card.

In addition, the image forming apparatus 10 is a so-called multifunction machine having not only a function of forming an image, but also multiple functions, for example, a facsimile function, a scanner function, a data retention function, and a data sending function. In general, in an office or the like, the multifunction machine has already been placed, and there are many cases where the power is turned on all day rather than being turned on when the multifunction machine is used. In addition, in general, even when the multifunction machine accesses a network or the like, it can be ascertained from which multifunction machine information has been sent.

The first server 14 is configured, for example, as an active directory, and is connected, for example, by a local area network (LAN) 32. The first server 14 authenticates whether or not the user is the user registered in the image forming apparatus 10 from the data read by the card reader 28.

The second server 16 configures a data base, and for example, functions as a ground connected via the Internet 34. The second server 16 authenticates whether or not the user is the user registered in the activity amount meter 12 read by the card reader 28.

Figure 2:
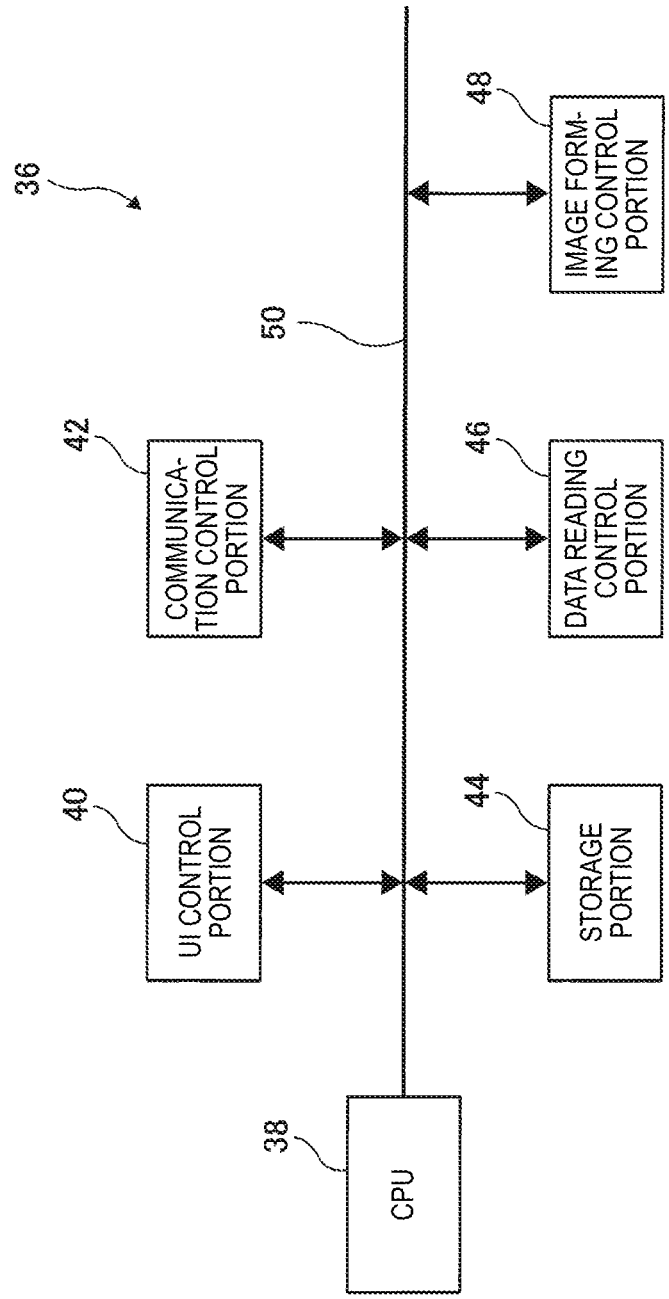
FIG. 2 is a block diagram illustrating a control device of an image forming apparatus according to the exemplary embodiment of the invention.

FIG. 2 is a block diagram illustrating a control device 36 of the image forming apparatus 10.

The control device 36 includes a CPU 38, a UI control portion 40, a communication control portion 42, a storage portion 44, a data reading control portion 46, and an image forming control portion 48, and the members are connected to each other via a control bus 50.

The CPU 38 performs processing which is determined in advance based on a control program stored in the storage portion 44. The UI control portion 40 is connected to the above-described user interface 24, and performs display control of the user interface 24 and receiving control of the data from the user interface 24. The communication control portion 42 controls communication between the above-described first server 14 and the second server 16. The data reading control portion 46 is connected to the above-described card reader 28, and performs receiving control of the data from the card reader 28. The image forming control portion 48 processes the received image and controls driving of the image forming apparatus 10 so that the image is formed by the above-described image forming portion 20.

Figure 3:
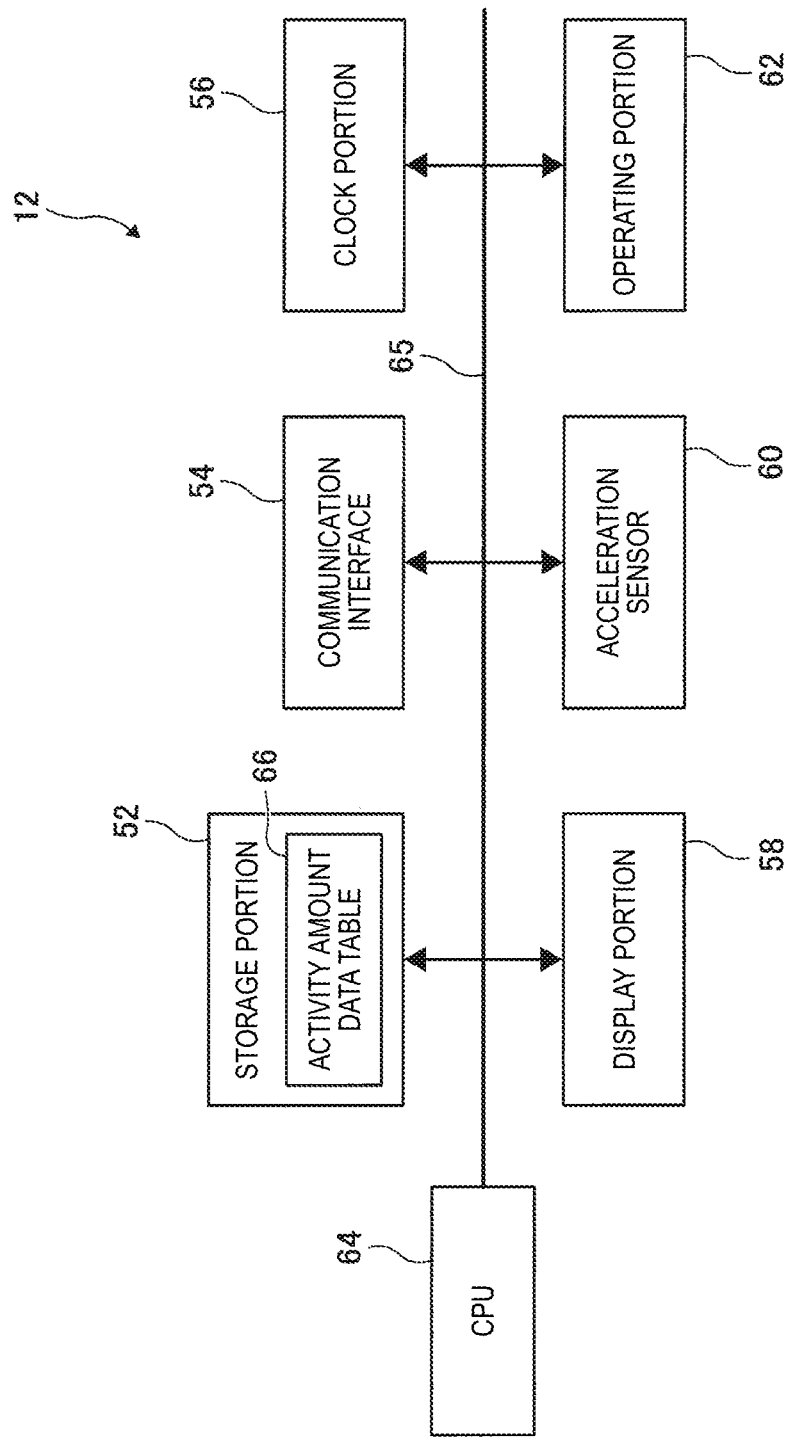
FIG. 3 is a block diagram illustrating an activity amount meter used in the exemplary embodiment of the invention.

FIG. 3 is a block diagram illustrating the activity amount meter 12.

The activity amount meter 12 includes a storage portion 52, a communication interface 54, a clock portion 56, a display portion 58, an acceleration sensor 60, an operating portion 62, and a CPU 64, and the members are connected to each other via a control bus 65.

The display portion 58 is configured, for example, of a liquid crystal display (LCD), and displays various types of information (for example, information related to various setting items, information related to operation guide, information related to consumption energy, and information related to body movement) output from the CPU 64.

In addition, the display portion 58 of the activity amount meter 12 has a smaller display region and a small amount of information which can be displayed, compare to the user interface 24 of the image forming apparatus 10.

The operating portion 62 is a member for various operations (for example, an information input operation or a setting operation) by the user.

The storage portion 52 is a nonvolatile storage medium, and stores various programs executed by being read by the CPU 64. In addition, an activity amount data table 66 which indicates an activity amount of the user is stored in the storage portion 52. In addition, the storage portion 52 stores IDm (first authentication data) which is an ID for authenticating the access to the image forming apparatus 10. The CPU 64 converts the IDm into a serial ID (second authentication data) which is an ID for authenticating the access to the second server 16 by executing a predetermined command when holding the activity amount meter 12 over the card reader 28 of the image forming apparatus 10. Here, the first authentication data is not limited to the IDm, and the second authentication data is not limited to the serial ID. Further, the second authentication data is not limited to the data that is converted from the first authentication data. For example, the storage portion 52 may store two kinds of authentication data for the first authentication data and the second authentication data.

The communication interface 54 is an interface which receives an external input. Specifically, the communication interface 54 is an integrated circuit (IC) card interface for performing communication in a non-touch manner using an electromagnetic wave. The clock portion 56 generates and outputs date and time information.

The acceleration sensor 60 detects acceleration generated in the activity amount meter 12, and generates acceleration data which is body movement information of the user. The acceleration data is the body movement information which quantitatively indicates the body movement of the user of the activity amount meter 12. In other words, the acceleration sensor 60 functions as a body movement information generating portion which generates the body movement information which indicates the body movement of the user.

Here, the activity amount meter 12 is not limited to a device specialized for measuring an activity amount of a user, as described above. In other words, the activity amount meter 12 may be realized by a function to measure an activity amount of a user in a device, such as a smartphone, used to achieve other purposes. For example, the activity amount meter 12 may be realized by a smartphone that includes the storage portion 52, the communication interface 54, the clock portion 56, the display portion 58, the acceleration sensor 60, the operating portion 62, and the CPU 64 and that is configured to measure and store the activity amount of a user by executing the application program stored in the storage portion 52. The activity amount of a user that the activity amount meter 12 measures may include at least one of number-of-steps, consumption energy, exercise quantity and the likes.

Figure 4:
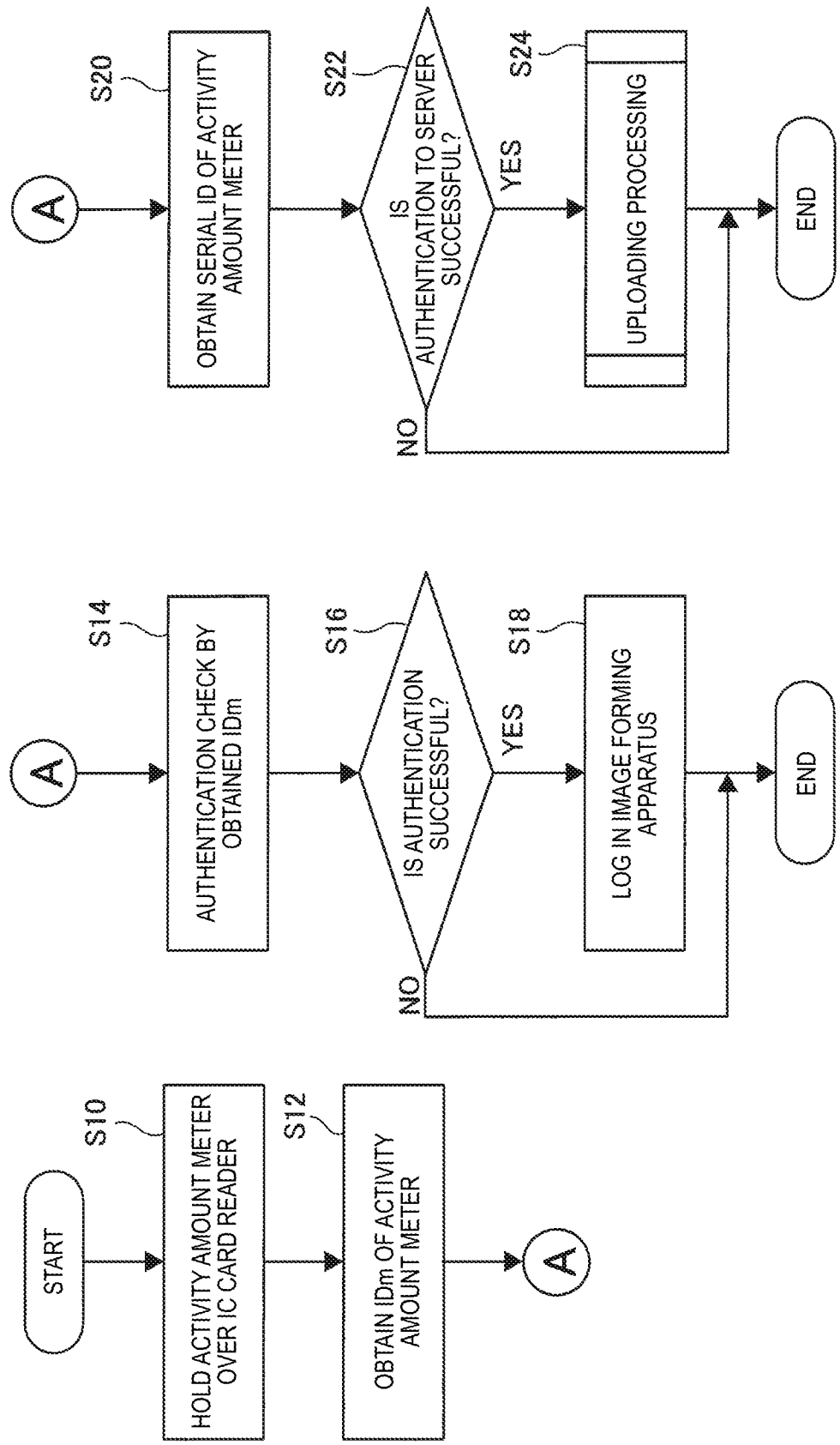
FIG. 4 is a flow chart of a case where the activity amount meter is held over a card reader in an operation flow of the control device of the image forming apparatus according to the exemplary embodiment of the invention.

FIG. 4 is a flow chart of a case where the activity amount meter 12 is held over the card reader 28 in an operation flow of the control device 36 of the image forming apparatus 10.

Figure 5:
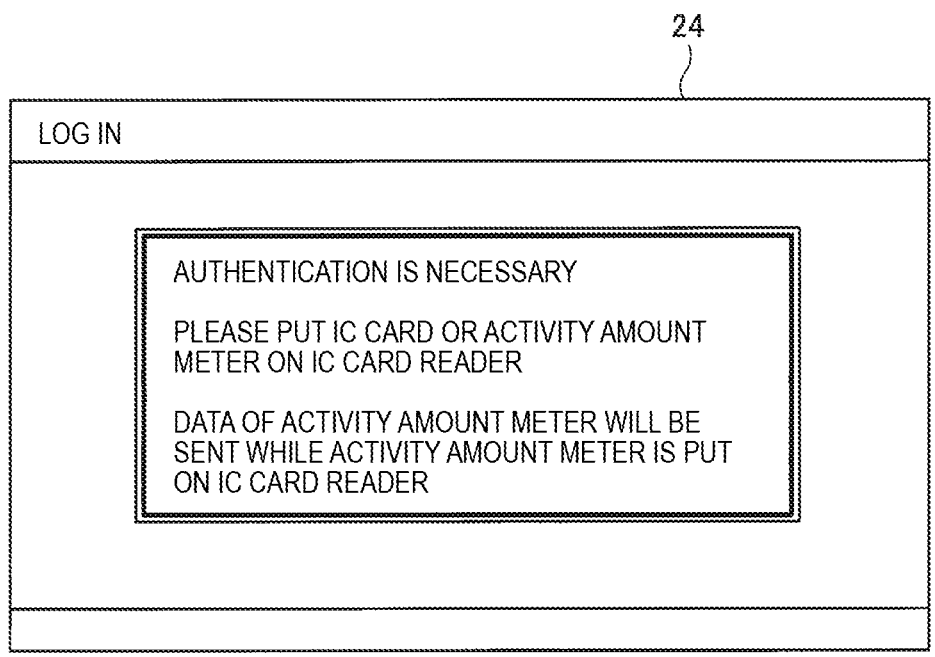
FIG. 5 is a screen view illustrating a screen of a user interface in an idle state, in the exemplary embodiment of the present invention.

Before holding the activity amount meter 12 over the card reader 28, a screen of an idle state illustrated in FIG. 5 is displayed in the user interface 24. In other words, for example, "Authentication is necessary. Please put the IC card or the activity amount meter on the IC card reader. The data stored in the activity amount meter will be sent while the activity amount meter is put on the IC card reader" is displayed.

Here, in step S10, when the activity amount meter 12 is held over the card reader 28, in the next step S12, the IDm stored in the storage portion 52 of the activity amount meter 12 is obtained.

In the next step S14, authentication check is performed by the obtained IDm. In the next step S16, it is determined whether or not the authentication is successful. In other words, when the data stored in the first server 14 and the IDm match each other, the authentication is successful, and when the data and the IDm does not match each other, the authentication is not successful. In step S16, in a case where it is determined that the authentication is successful, the process moves to step S18, and logging in the image forming apparatus 10 is performed. By the log-in, a menu screen of the multifunction machine can be displayed and executed. In step S16, in a case where it is determined that the authentication is not successful, the processing is finished.

In addition, the authentication by the IDm can be performed by storing the data in the storage portion 44 of the image forming apparatus 10, and by determining whether or not the data and the IDm match each other.

When the processing of step S12 is finished, the process moves to step S14, and at the same time, moves to step S20, and the serial ID, which is obtained by converting from IDm by the CPU 64, is obtained. In the next step S22, it is determined whether or not the authentication to the second server 16 is successful. In other words, the serial ID is sent via the Internet 34 from the communication control portion 42 of the image forming apparatus 10, and in the second server 16, it is determined whether or not the sent serial ID and the data stored in the second server 16 match each other, and the determination result is sent back to the image forming apparatus 10.

In a case where a signal which indicates that the serial ID and the data stored in the second server 16 match each other is received, it is determined that the authentication is successful, and in a case where a signal which indicates that the serial ID and the data do not match each other is received, it is determined that the authentication is not successful.

In step S22, in a case where it is determined that the authentication to the second server 16 is successful, the process moves to the next step S24, and uploading processing which will be described later is performed, and in a case where it is determined that the authentication to the second server 16 is not successful, the processing is finished.

As described above, when the activity amount meter 12 is held over the card reader 28, the processing of steps S14 to S18 for performing the authentication to the image forming apparatus 10, and steps S20 to S24 for performing the authentication to the second server 16, are performed at the same time. In addition, in step S22, in a case where the authentication to the second server 16 is successful, even when there is not a particular instruction of uploading, the uploading processing which will be described later is automatically performed. In this manner, by omitting an uploading instruction or an activation instruction of a dedicated application, it is possible to perform the instructions of additional functions, such as print-out or copy, saving time and effort of instructing by the user during the same time period which corresponds to the time period of giving the instruction. A configuration of not only being capable of giving the instruction to the multifunction machine, but also being practically performed following the instruction, may be employed. In addition, when logging in the multifunction machine, even without the instruction, any processing, for example, processing in uploading in a case where FAX sent to the user is set to be automatically output, may be performed.

Figure 6:
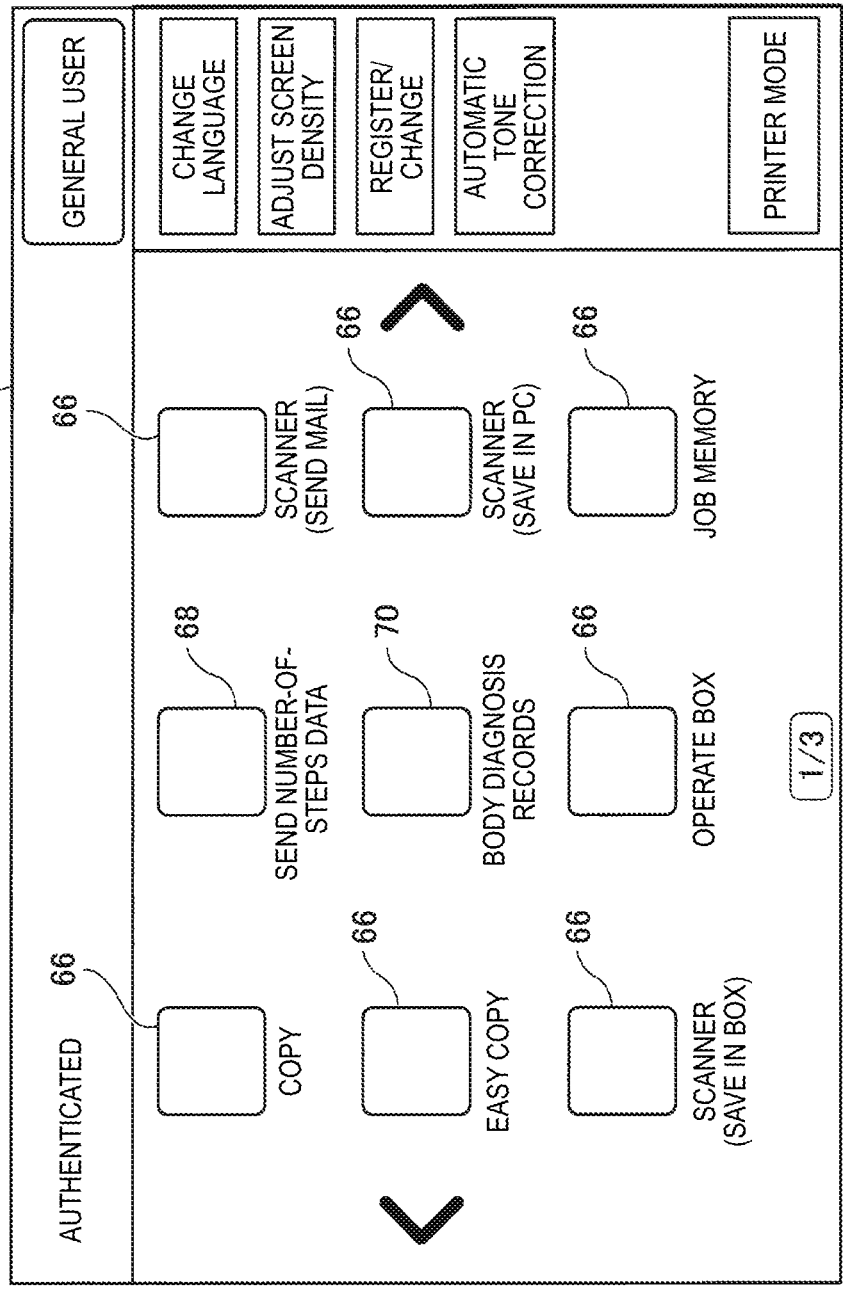
FIG. 6 is a screen view illustrating the screen of the user interface of a case where it is determined that authentication to a second server is successful, in the exemplary embodiment of the invention.

FIG. 6 illustrates a screen of the user interface 24 of a case where it is determined that the authentication to the second server is successful in step S22. In addition to the icons 66, such as copy or scanner, which are generally used, an icon 68 "send number-of-steps data" and an icon 70 "body diagnosis records" are displayed. In general, when pressing the icon 66 which is used as the image forming apparatus, the function which corresponds thereto can be performed. In other words, the uploading processing of step S24 is processing on the background, and even in uploading, a use instruction is received.

In addition, even when extraction of the data itself is finished in several tens of seconds, there is a case where the data is sent to the server, the sending confirmation is received from the server, and the extraction takes several minutes when the data is removed.

In addition, the name of the icons 68 is "send number-of-steps", but the number of steps is a representative example of the data stored in the activity amount meter 12, and may include other types of data.

Figure 7:
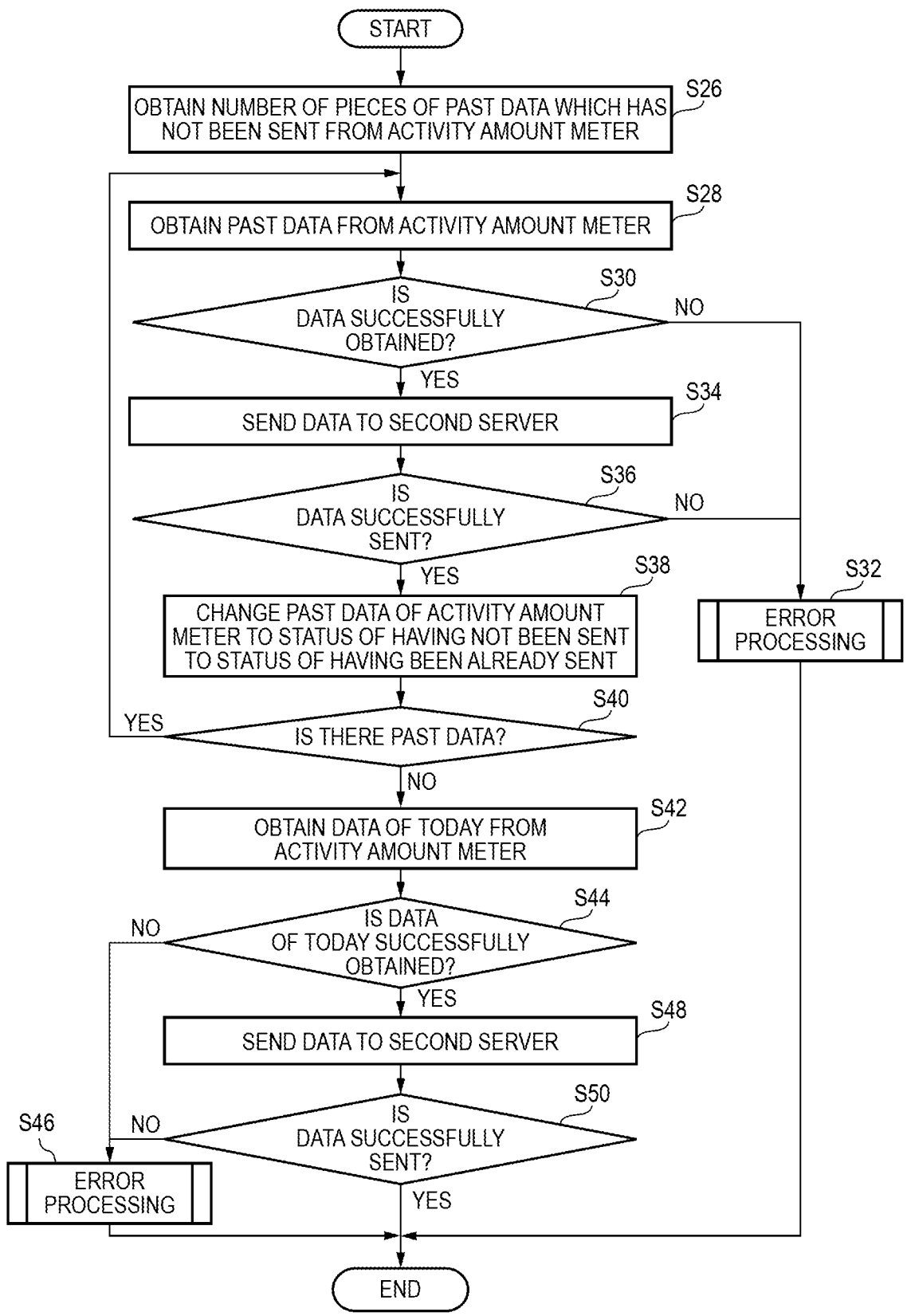
FIG. 7 is a flow chart illustrating uploading processing in detail, in the exemplary embodiment of the invention.

FIG. 7 illustrates the uploading processing illustrated in step S24 of FIG. 4 in detail.

First, in step S26, the number of pieces of past data which has not been sent is obtained from the activity amount meter 12. Here, the past data is data stored every day in the past except for today. In the nest step S28, the past data is obtained from the activity amount meter 12. In the next step S30, it is determined whether or not the past data is successfully obtained. In the step S30, in a case where the past data is not successfully obtained, the process moves to step S32, and in step S32, error processing is performed and the processing is finished.

In step S30, in a case where it is determined that the past data is successfully obtained, the process moves to step S34, and the obtained past data is sent to the second server 16. In the next step S36, it is determined whether or not the past data is successfully sent. In step S36, in a case where it is determined that the past data is not successfully sent, the process moves to step S32, and the error processing is performed. Meanwhile, in step S36, in a case where it is determined that the past data is successfully sent, the process moves to step S38. In step S38, a status in which the past data stored in the activity amount meter 12 has not been sent changes to a status in which the past data has already been sent. In the next step S40, it is determined whether or not there is the past data (whether or not all pieces of past data are in a status of having been sent). In a case where there is the past data, the process returns to step S28, and the past data is obtained from the activity amount meter 12. In step S40, in a case where it is determined that there is not the past data, the process moves to the next step S42.

In step 42, the data of today is obtained from the activity amount meter 12, and the process moves to the next step S44. In step S44, it is determined whether or not the data of today is successfully obtained. In step S44, in a case where it is determined that the data of today is not successfully obtained, the process moves to step S46, and the error processing is performed. Meanwhile, in step S44, in a case where it is determined that the data of today is successfully obtained, the process moves to the next step S48. In step S48, the data of today is sent to the second server 16, and the process moves to the next step S50. In step S50, it is determined whether or not the data is successfully sent to the second server 16. In step S50, in a case where the data is successfully sent, the processing is finished, and in a case where the data is not successfully sent, the process moves to step S46, the error processing is performed, and then, the processing is finished.

In addition, regarding the data of today, there is a possibility that the data is further updated today, and thus, it is desirable not to eliminate the data. Meanwhile, in a case where the past data is uploaded, it is preferable to eliminate all pieces of the uploaded past data from the storage portion 52.

Figure 8:
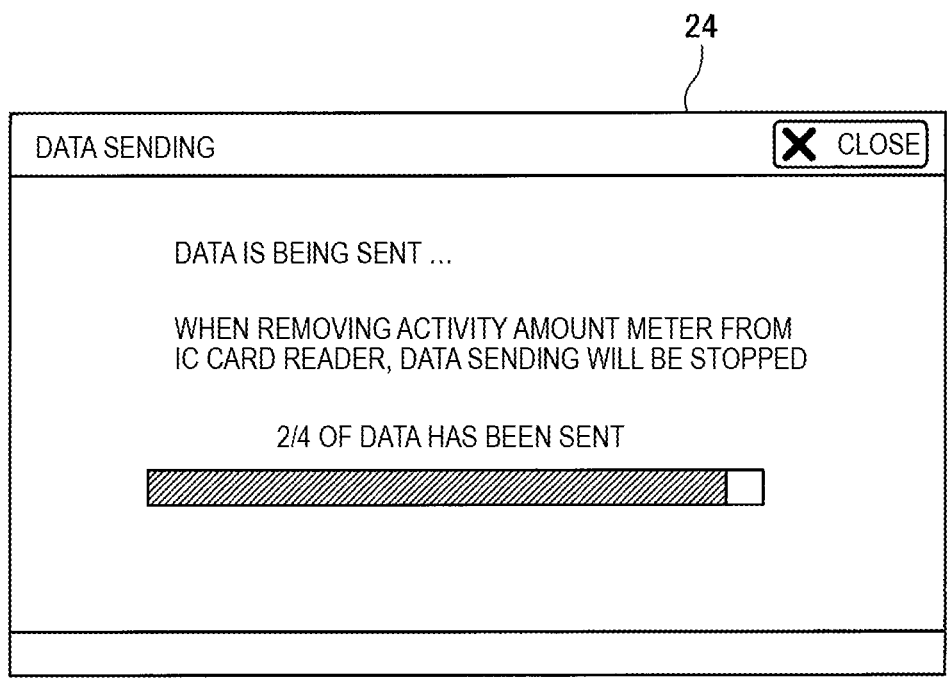
FIG. 8 is a screen view illustrating the screen of the user interface of a case in upload sending, in the exemplary embodiment of the invention.

FIG. 8 illustrates an example of a screen which is displayed in upload sending, in a case of pressing the icon 68 "send number-or-steps data". In other words, a note "the data is being sent" and a note "when removing the activity amount meter from the card reader, the data sending will be stopped" are displayed together. In addition, how much data has been already sent and how much data to be sent remains are displayed.

Figure 9:
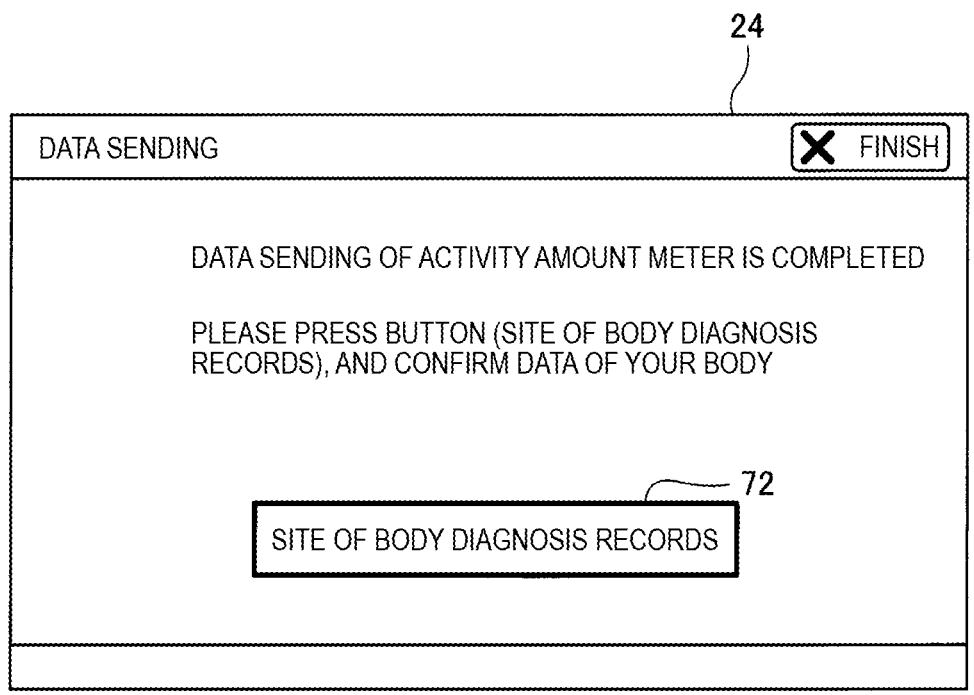
FIG. 9 is a screen view illustrating the screen of the user interface of a case where the upload sending is finished, in the exemplary embodiment of the invention.

FIG. 9 illustrates an example of a screen which is displayed in a case where the data sending is finished from the state of FIG. 8. In addition to a note "the data sending is finished", a note "Please press a button for the site of body diagnosis records, and confirm data of your body" is displayed, and at the same time, a button for moving to the site of the body diagnosis records is displayed. In addition, the screen which displays that the uploading is finished illustrated in FIG. 9, is necessarily displayed not only in a case where a state is transited from a state displayed in upload sending illustrated in FIG. 8, but also in a case where the uploading is finished when any screen is displayed.

Figure 10:
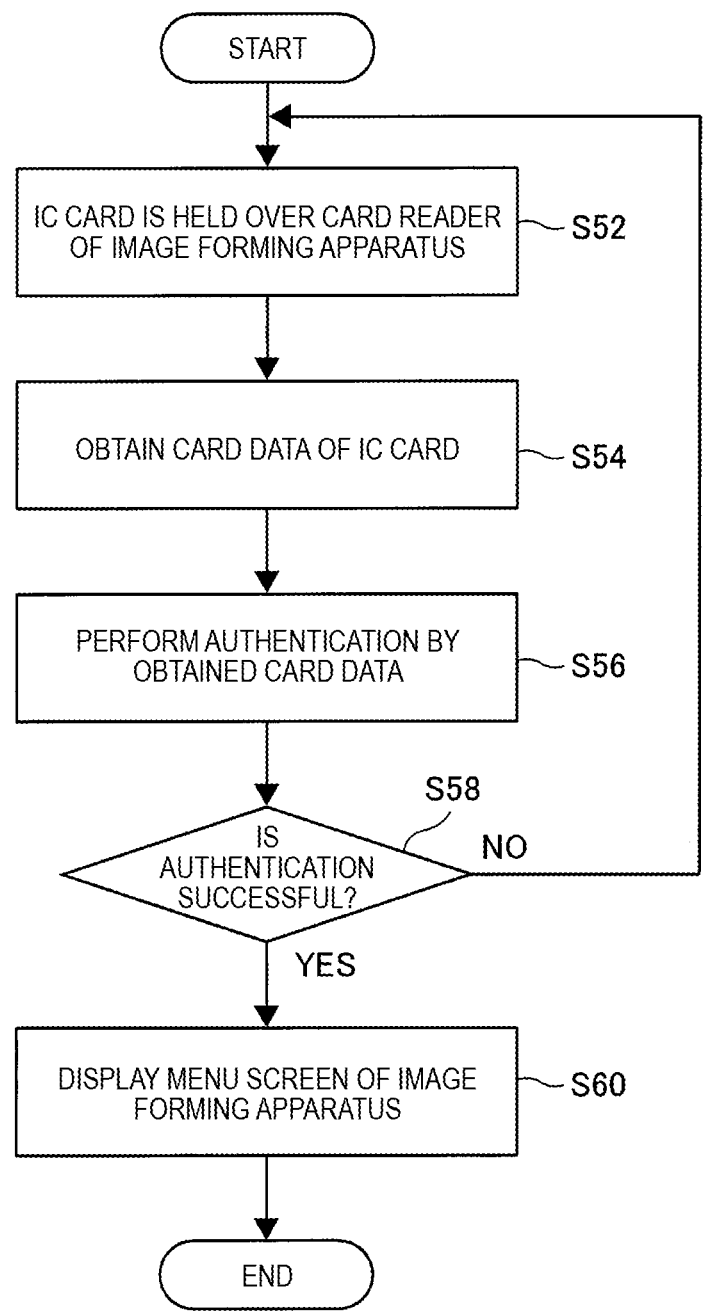
FIG. 10 is a flow chart of a case where an IC card is held over the card reader in an operation flow of the control device of the image forming apparatus, in the exemplary embodiment of the invention.

FIG. 10 is a flow chart of a case where the IC card 30 is held over the card reader 28 in an operation flow of the control device 36 of the image forming apparatus 10.

In step S52, when the IC card 30 is held over the card reader 28, the process moves to step S54, and card data (third authentication data) of the IC card 30 is obtained. In the next step S56, the authentication is performed by the card data obtained in step S54. In the next step S58, it is determined whether or not the authentication is successful. Regarding the determination of whether or not the authentication is successful, the authentication is successful when the data stored in the first server 14 and the card data match each other, and the authentication is not successful when the data stored in the first server 14 and the card data do not match each other. In step S58, in a case where it is determined that the authentication is successful, the process moves to step S60, the menu screen of the image forming apparatus 10 is displayed, and the processing is finished. In step S58, in a case where it is determined that the authentication is not successful, the process returns to the start.

In addition, the authentication by the card data can be performed by storing the data in the storage portion 44 of the image forming apparatus 10, and by determining whether or not the data and the card data match each other.

Figure 11:
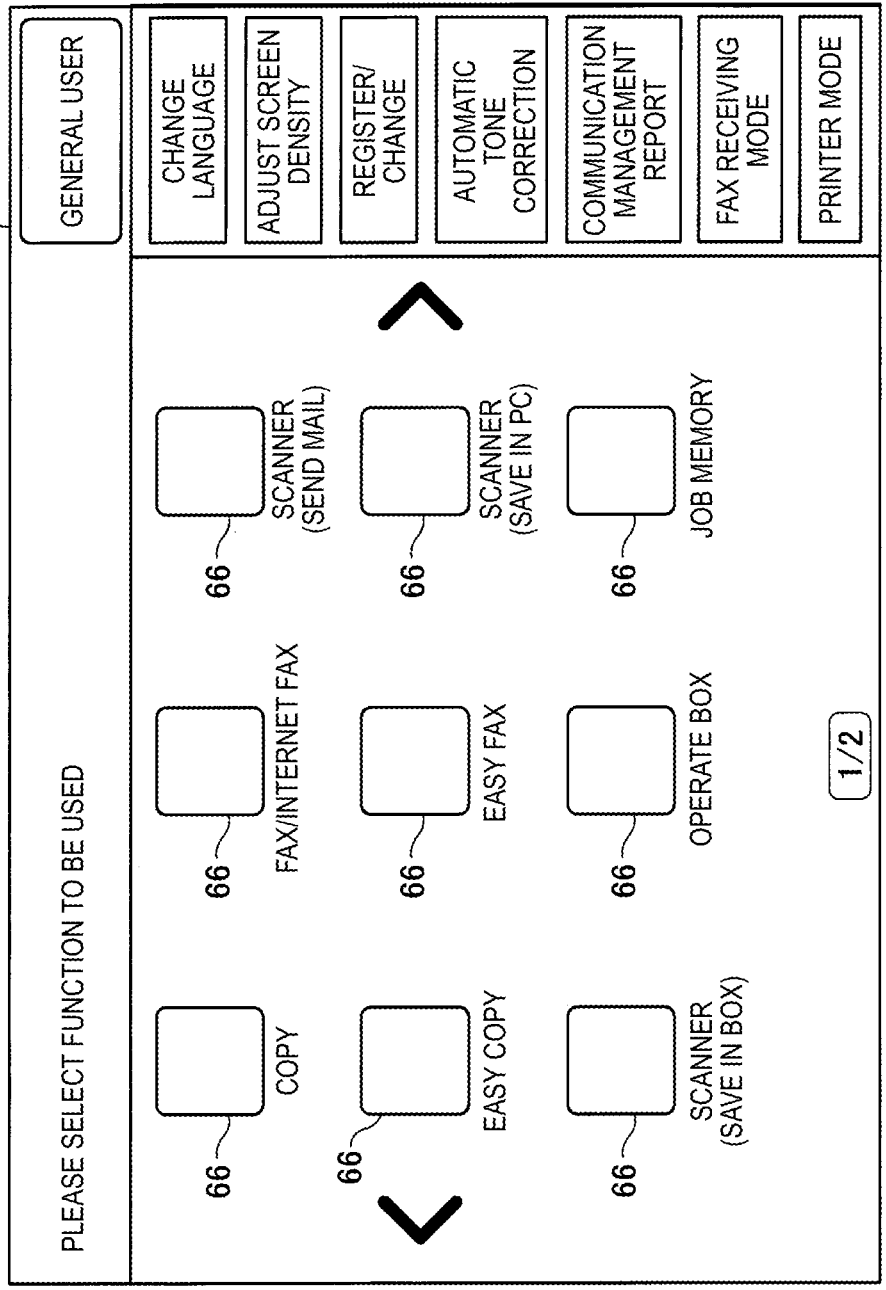
FIG. 11 is a screen view illustrating the screen of the user interface of a case where the authentication is successful, in the exemplary embodiment of the invention.

FIG. 11 is a menu screen which is displayed in the user interface 24 in a case where the authentication is successful in step S56. On the menu screen, the icons 66 which are used as general image forming apparatuses are displayed. The screen in FIG. 11 is different from that in the case of logging in with the above-described activity amount meter 12 in FIG. 6 in that the icon 68 "send number-of-steps data" and the icon "body diagnosis records" are not displayed in addition to the icons 66 which are used as the general image forming apparatuses.

However, by logging in with the IC card 30, even in a case where the second authentication is not successful, the same screen as that of FIG. 6 is displayed, and in a case of using the functions "send number-of-steps data" and "body diagnosis records", the activity amount meter 12 may be held over the card reader 28. In this case, in a case where the activity amount meter is not held, in a case where the "send number-of-steps" and "body diagnosis records" are selected, it may be encouraged to hold the activity amount meter.

Figure 12:
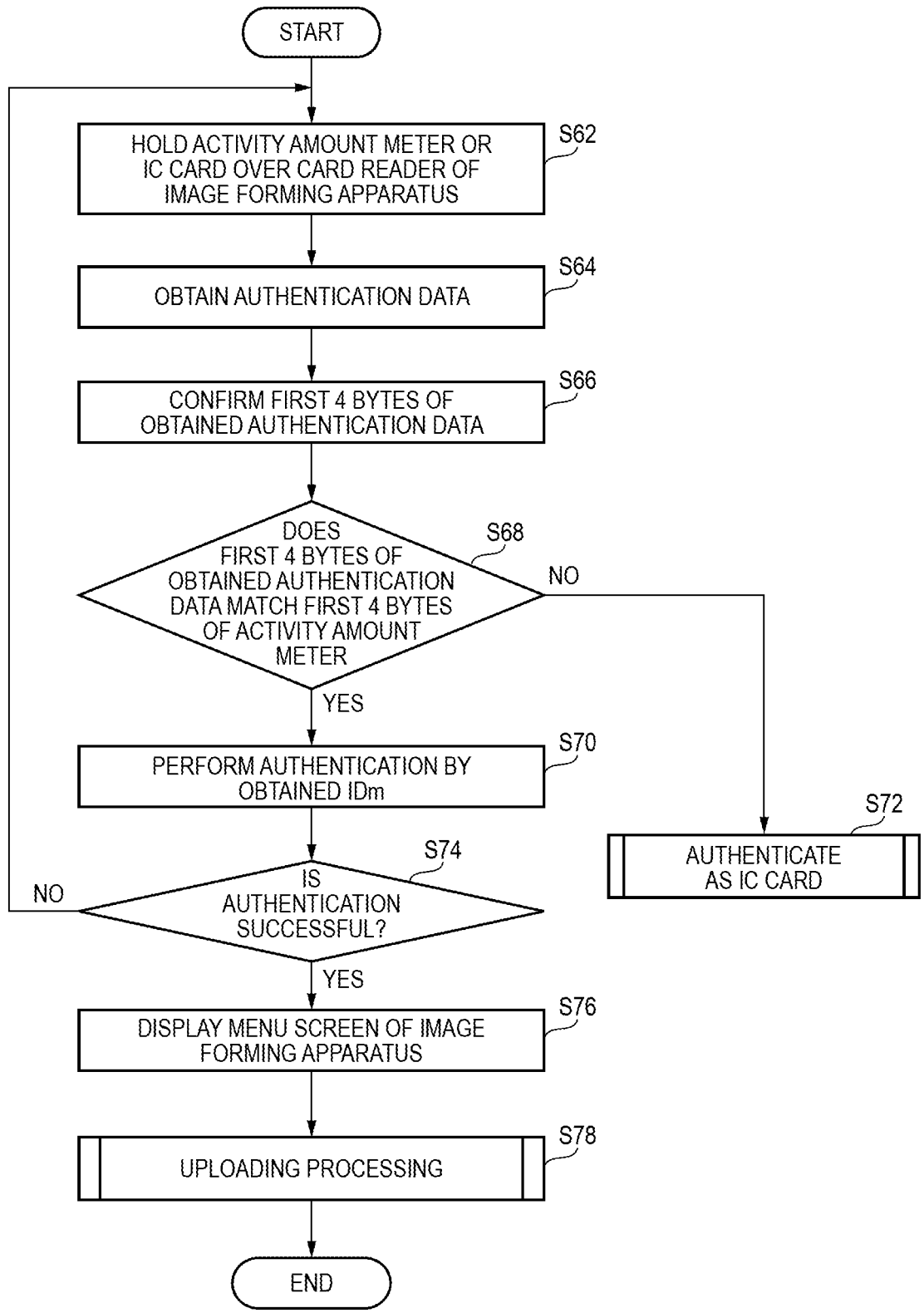
FIG. 12 is a flow chart of a case where the activity amount meter or the IC card is held over the card reader in an operation flow of the control device of the image forming apparatus, in the exemplary embodiment of the invention.

FIG. 12 is a flow chart of a case where the activity amount meter 12 or the IC card 30 is held over the card reader 28 in an operation flow of the control device 36 of the image forming apparatus 10. In other words, FIG. 12 is a flow chart of a case where it is not apparent which one of the activity amount meter 12 and the IC card is held.

First, in step S62, when the activity amount meter 12 or the IC card 30 is held over the card reader 28 of the image forming apparatus 10, in the next step S64, the authentication data is obtained. In the next step S66, the first 4 bytes of the authentication data obtained in step S64 are confirmed. In the next step S68, it is determined whether or not the first 4 bytes of the activity amount meter 12 determined in advance and the first 4 bytes confirmed in step S66 match each other. In step S68, in a case where it is determined that the bytes match each other, the process moves to step S70, and the authentication is performed by the IDm obtained as the activity amount meter 12. Meanwhile, in step S68, in a case where it is determined that the bytes do not match each other, it is assumed that the IC card 30 is used, and thus, the process moves to step S72 and the authentication processing by the IC card is performed.

After performing the processing of step S70, the process moves to step S74, and it is determined whether or not the authentication is successful. In a case where it is determined that the authentication is not successful in step S74, the process returns to the start. In a case where it is determined that the authentication is successful in step S74, the process moves to step S76, and the menu screen illustrated in FIG. 6 is displayed, and in the next step S78, the above-described uploading processing is performed and the processing is finished.

In addition, in a case where the authentication is performed by the activity amount meter 12, and in a case where the authentication is performed by the IC card 30, it is possible to make the notification methods of each case different from each other. For example, it is possible to change the number of sounds or frequency, or to change the color displayed in the user interface 24.

Figure 13:
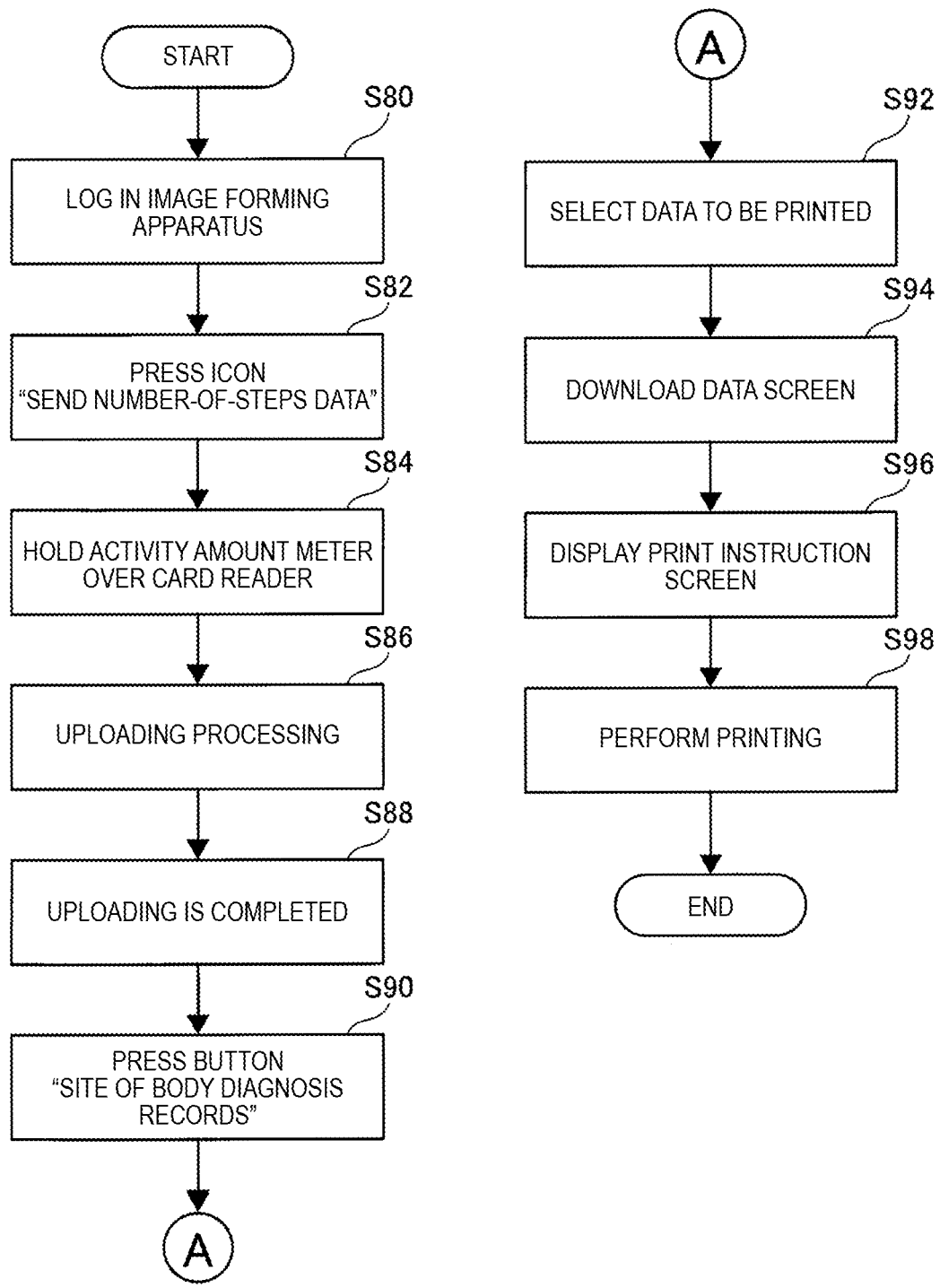
FIG. 13 is a flow chart of a first example illustrating an operation flow to printing after logging in the image forming apparatus, in the exemplary embodiment of the invention.
Figure 14:
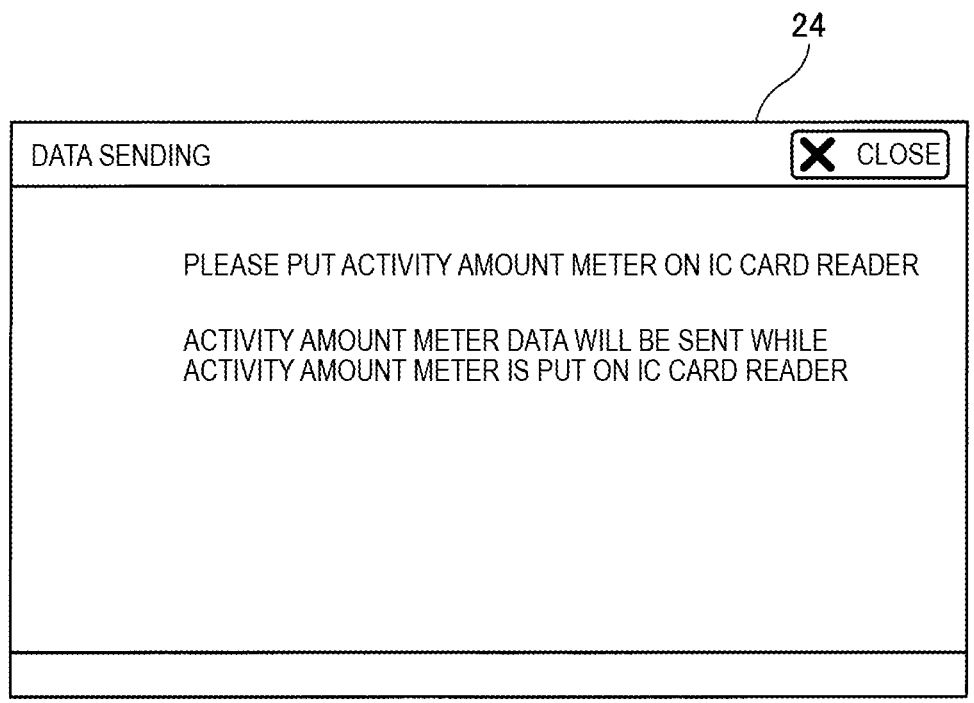
FIG. 14 is a screen view illustrating the screen of the user interface of a case of pressing an icon "send number-of-steps data", in the exemplary embodiment of the invention.

FIG. 13 is a flow chart of a first example illustrating an operation flow to printing after logging in the image forming apparatus 10. In step S80, when logging in the image forming apparatus 10 by the IC card 30, the menu screen illustrated in FIG. 6 is displayed in the user interface 24. Here, in the next step S82, when pressing the icon 68 "send number-of-steps data", the screen illustrated in FIG. 14 is displayed. In other words, for example, sentences "Please put the activity amount meter on the IC card reader. The activity amount meter data will be sent while the activity amount meter is put on the IC card reader" are displayed.

Figure 15:
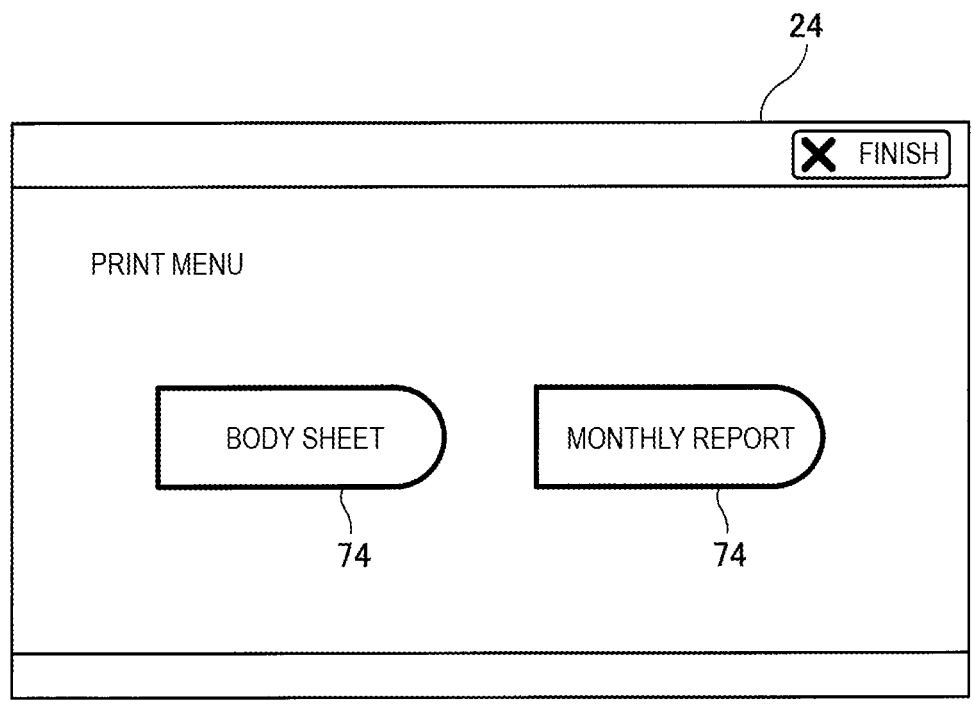
FIG. 15 is a screen view illustrating the screen of the user interface of a case of pressing a button "site of body diagnosis records", in the exemplary embodiment of the invention.

In the next step S84, when the activity amount meter 12 is held over the card reader 28, the process moves to the next step S86, and the above-described uploading processing is performed. In uploading processing, the screen illustrated in FIG. 8 is displayed. In the next step S88, when the uploading is completed, the screen illustrated in FIG. 9 is displayed. In the next step S90, when pressing a button 72 "site of the body diagnosis records", as the screen illustrated in FIG. 15 is displayed, icons 74 for outputting the data (body diagnosis records) obtained by processing the data sent to the second server 16 in the second server 16, such as a graph which indicates a change in the number of steps each month, are displayed. Here, when pressing the button 72 and selecting the data to be printed in step S92, the process moves to step S94, and the selected data screen to be printed is downloaded.

In the next step S96, a screen for printing instruction, such as "printing" is displayed.

In the next step S98, the printing is performed, and the processing is finished.

In addition, the screen which is displayed when pressing the button of body diagnosis records is not limited to the screen of FIG. 15. For example, partial information of the body diagnosis records may be displayed on the display screen, and the detailed information may be output in a case where a print-out instruction is given. This is because there is a difference in information amount which can be seen at the same time between a case of printed-out paper sheet and a case of display portion of the multifunction machine. For example, a degree of achievement of a target may be displayed by numbers obtained by a difference between the number of steps in the past one month and the target number of steps for one month on the display screen, a graph for each day of one month may be on the printed-out paper, and a display order may be changed on the display on the display screen and on the printed-out paper.

Figure 16:
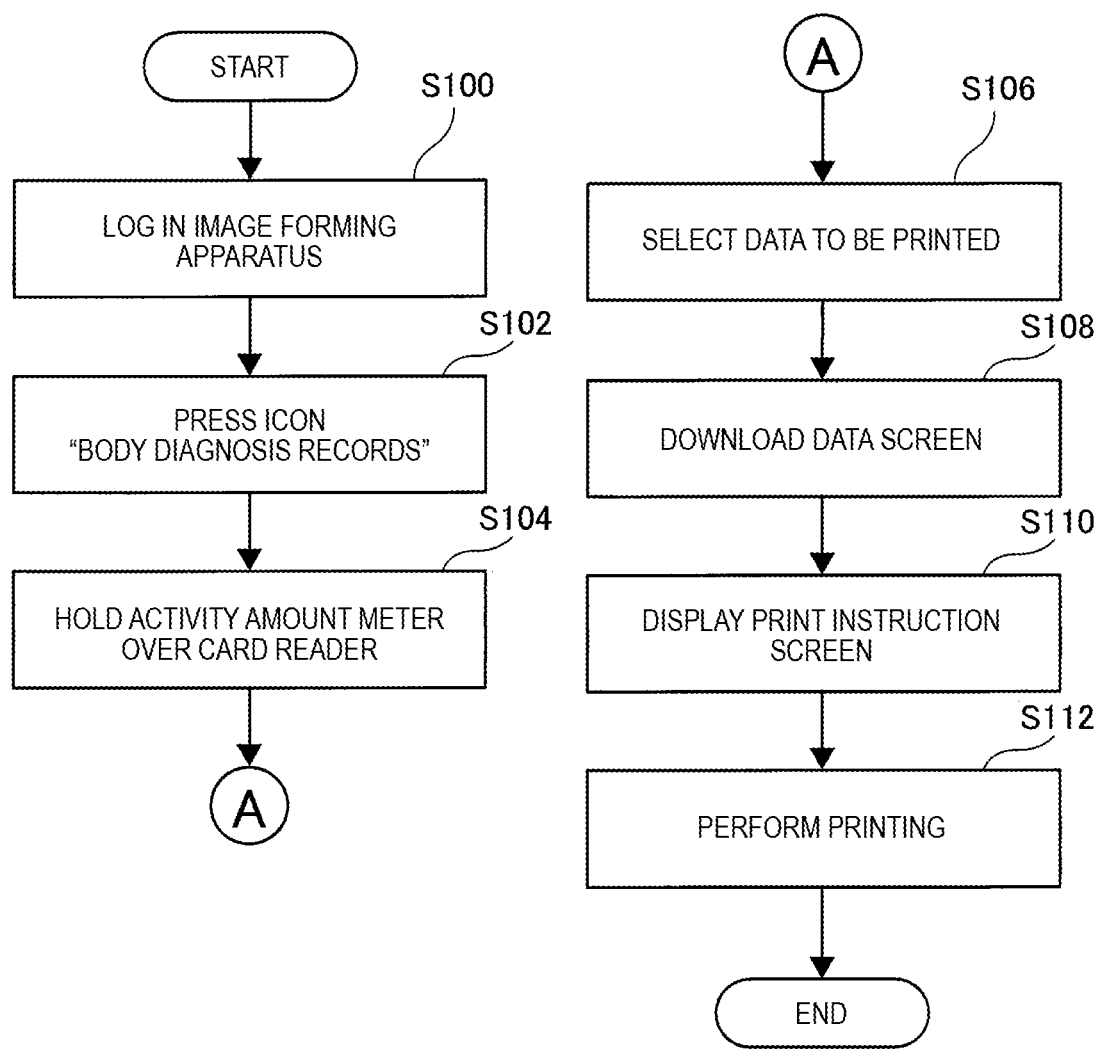
FIG. 16 is a flow chart of a second example illustrating an operation flow to printing after logging in the image forming apparatus, in the exemplary embodiment of the invention.

FIG. 16 is a flow chart of a second example illustrating an operation flow to printing after logging in the image forming apparatus 10.

Figure 17:
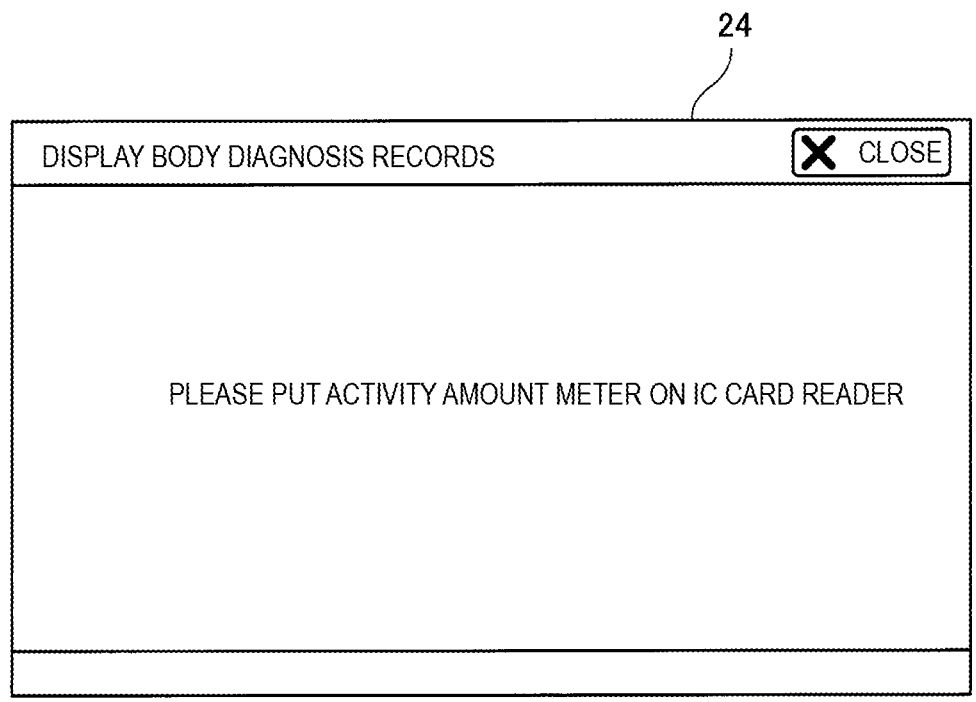
FIG. 17 is a screen view illustrating the screen of the user interface of a case of pressing an icon "body diagnosis records", in the exemplary embodiment of the invention.

In step S100, when logging in the image forming apparatus 10 by the IC card 30, the menu screen illustrated in FIG. 6 is displayed in the user interface 24. Here, in the next step S102, when pressing the icon "body diagnosis records", the screen illustrated in FIG. 17 is displayed. In other words, for example, a sentence "Please put the activity amount meter on the IC card reader" is displayed.

In the next step S104, when the activity amount meter 12 is held over the card reader 28, the process moves to steps S106 to S112, and similar to the above-described steps S92 to S98, it is possible to print the data screen to be printed.

The above-described second server 16 accumulates the data of the user from the activity amount meter 12 via the image forming apparatus 10, and generates the accumulated "body diagnosis records" of the user. The "body diagnosis records" is obtained by visualizing the data related to the activity amount by a graph or the like. In the second server 16, the "body diagnosis records" is stored as a web page having a uniform resource locator (URL) given thereto.

In step S88, by designating the URL of the "body diagnosis records", the image data of the "body diagnosis records" is downloaded in step S90.

In addition, in the above-described exemplary embodiment, in a case of printing the "body diagnosis records", the activity amount meter 12 is held over the card reader 28 after logging in the image forming apparatus 10 and the authentication is obtained.

However, in a case where the authentication data stored in the IC card 30 and the serial ID of the activity amount meter 12 are associated with each other and are stored in the first server 14, and logging in the image forming apparatus 10 is performed by the IC card 30, the serial ID of the activity amount meter 12 is called out from the first server 14, and the authentication to the second server 16 may be achieved.

In addition, in a case of making it possible for the same user to log in the multifunction machine by both the activity amount meter and the IC card, and in a case where the content of the first authentication data read from the activity amount meter and the content of the first authentication data read from the IC card are different from each other, association of each of the contents may be performed, and without performing the association, each of the contents may be registered in the first server. After logging in the multifunction machine, when using a function of attaching output recording for each user or sending the read data to a PC of the user by an electronic mail, the same result is expected in logging in by any of the activity amount meter and the IC card, and thus, each of the contents may be registered.

In addition, when the first authentication data read from the activity amount meter and the first authentication data read from the IC card are different from each other, it is easy to distinguish the activity amount meter, and it is easy to correspond to the plural types of activity amount meters having different data structure.

However, the first authentication data read from the activity amount meter and the first authentication data read from the IC card may be the same. In this case, the association may be performed, and plural registrations with respect to one user may not be performed.

In addition, in the above-described exemplary embodiment, the data processed in the second server 16 is printed and output by the image forming apparatus 10, but the invention is not limited thereto, and for example, the data may be displayed in the user interface 24, or may be sent to other apparatuses, for example, a personal computer.

The multifunction machine in the exemplary embodiment may be managed by a company or an autonomous body. In this case, it is not necessary to access the network directly or indirectly using a personal terminal. In addition, the processed information by uploading the activity amount is not grasped by one person, and the company or the autonomous body can grasp the information as a part of health promotion. There is also an activity amount meter which has a function of network connection, and which can be connected to the network via a personal terminal.

However, in the above-described exemplary embodiment, the functions are not necessary in the activity amount meter itself as long as uploading is possible.

In addition, from which multifunction machine the data has been sent may be ascertained, or a measure on security or server addition may be included in the sending and receiving function of the multifunction machine.

In the above-described exemplary embodiment, an example in which the function instruction of the multifunction machine can be given even in uploading in a case of logging in by the activity amount meter is explained, but the invention is not limited thereto. In a case of logging in by the activity amount meter and in a case of logging in by the IC card, the contents which can be given as the function instruction of the multifunction machine may be changed.

In the above-described exemplary embodiment, an example in which the first server 14 is connected to the image forming apparatus 10 via LAN 32 and the second server 16 is connected to the image forming apparatus 10 via the Internet 34 is shown, but the invention is not limited thereto. For example, both of the first server 14 and the second server 16 may be connected to the image forming apparatus 10 via the Internet 34. Further, the invention is not limited to the example in which the first server 14 and the second server 16 are provided separately. For example, the first server 14 and the second server 16 may be realized in a server housing of the second server 16 that is connected to the image forming apparatus 10 via the Internet 34 and is provided with the function of the first server 14, described above.

In the above-described exemplary embodiment, a case where the data of the number of steps is uploaded by the activity amount meter is described, but the equipment to be targeted or the information to be uploaded is not limited thereto. For example, blood pressure information measured by a sphygmomanometer, or information, such as weight or body fat percentage, measured by a body composition meter, may be uploaded by directly or indirectly holding the information, or a body chart may be created by the comprehensive data. In addition, schedule stored in an electronic organizer, phone numbers stored in a phone, or the information stored in an IC chip may be uploaded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The description of embodiments may disclose the following matters.

[1] An image forming apparatus includes: a reading unit that reads data stored in an activity amount meter; at least one of an image forming unit that forms an image on a recording medium and an image reading unit that reads the image; a display unit that displays an option to be selected such that the display unit receives a use instruction of a function that is selected; and a sending unit that sends the data stored in the activity amount meter and read by the reading unit. The display unit receives the use instruction even when the sending unit is sending the data stored in the activity amount meter and read by the reading unit.

[2] In the image forming apparatus according to [1], first authentication data may be included in the data read from the activity amount meter, and it may be determined with the first authentication data whether it is allowed to execute at least one of the image forming unit and the image reading unit.

[3] In the image forming apparatus according to [1] or [2], second authentication data may be included in the data read from the activity amount meter, it may be determined with the second authentication data whether the sending unit is allowed to send the data, and in a case where it is determined that the sending unit is allowed to send the data, regardless of the presence or the absence of reception of the use instruction of the function by the display unit, the sending unit may send data determined in advance among the data stored in the activity amount meter.

[4] In the image forming apparatus according to [1] including the image forming unit, first authentication data and second authentication data may be included in the data read from the activity amount meter, it may be determined with the first authentication data whether the image forming unit is allowed to be executed, and it may be determined with the second authentication data whether the sending unit is allowed to send the data.

[5] In the image forming apparatus according to any of [1] to [4], the display unit may display an option for displaying a sending state of the data stored in the activity amount meter and read by the reading unit.

[6] In the image forming apparatus according to any of [1] to [4], the display unit may display an option for outputting processed data obtained by processing the data stored in the activity amount meter and read by the reading unit.

[7] In the image forming apparatus according to any of [1] to [6], in a case where sending of the data stored in the activity amount meter and read by the reading unit is completed, the display unit may display a note that the sending is completed even in displaying any screen.

[8] In the image forming apparatus according to any of [1] to [7], the reading unit may read data stored in an IC card in addition to the data stored in the activity amount meter.

[9] In the image forming apparatus according to [8] including the image forming unit, third authentication data may be included in the data read from the IC card, and it may be determined with the third authentication data whether it is allowed to execute the image forming unit.

[10] The image forming apparatus according to [8] or [9] may further include: a determining unit that determines whether authentication data read by the reading unit is from the activity amount meter or from the IC card.

[11] In the image forming apparatus according to [10], the display unit may display a different option according to a result of the determination by the determining unit.

[12] In the image forming apparatus according to any of [8] to [11], second authentication data read from the activity amount meter and third authentication data read from the IC card may be associated with each other, and in a case where the authentication is performed based on the third authentication data stored in the IC card, the display unit may display an option for outputting processed data obtained by processing the data stored in the activity amount meter and read by the reading unit.

[13] An image forming apparatus includes: a reading unit that reads data stored in an activity amount meter; an image forming unit that forms an image on a recording medium; a display unit that displays an option to be selected such that the display unit receives a use instruction of a function that is selected; and a sending unit that sends the data stored in the activity amount meter and read by the reading unit. The display unit displays an output option for outputting processed data obtained by processing the data stored in the activity amount meter and read by the reading unit.

[14] In the image forming apparatus according to [13], the output option may be an option to be selected to print the processed data by the image forming unit, the processed data being obtained by processing the data stored in the activity amount meter and read by the reading unit by the image forming unit.

[15] In the image forming apparatus according to [13] or [14], the display unit may receive the use instruction even when the sending unit is sending the data stored in the activity amount meter and read by the reading unit.

[16] In the image forming apparatus according to any of [13] to [15], authentication data for logging in may be included in the data stored in the activity amount meter, and the output option may be displayed in a case where the authentication is performed with the authentication data.

[17] In the image forming apparatus according to any of [13] to [16], the data stored in the activity amount meter and read by the reading unit may be processed by a server, authentication data used in cooperation with the server may be included in the data stored in the activity amount meter, and in a case where authentication is performed with the authentication data in cooperation with the server, the display unit may display the output option.

[18] An image forming apparatus includes: a reading unit that reads data including authentication data read from an activity amount meter and an IC card; an image forming unit that forms an image on a recording medium; and a control unit that performs control to allow the data stored in the activity amount meter and read by the reading unit to be sent in a case where authentication is performed by reading the authentication data stored in the activity amount meter by the reading unit, and to allow the image to be formed by the image forming unit in a case where authentication is performed by reading the authentication data stored in the IC card by the reading unit.

[19] In the image forming apparatus according to [18], first authentication data and second authentication data may be included in the data stored in the activity amount meter, and the control unit may perform control to allow the image forming unit to form the image with the first authentication data, and to allow the data stored in the activity amount meter and read by the reading unit with the second authentication data.

[20] The image forming apparatus according to [18] or [19] may further include: a sending unit for sending the data stored in the activity amount meter and read by the reading unit. The control unit may perform control to send the data stored in the activity amount meter by the sending unit in a case where the authentication is performed with the activity amount meter.

[21] In the image forming apparatus according to any of [18] to [20], the sending unit may send the data stored in the activity amount meter and read by the reading unit to a server.

[22] In the image forming apparatus according to [21], the control unit may perform control to allow the image forming unit to form the image even when the sending unit is sending the data.

[23] In the image forming apparatus according to any of [18] to [21], the control unit may perform control such that different notification method is used according to whether the authentication is performed with the activity amount meter or with the IC card.

[24] In the image forming apparatus according to any of [18] to [23], the control unit may display a caution not to make the activity amount meter separated from the reading unit in sending the data by the sending unit.

[25] The image forming apparatus according to any of [18] to [24] may further include: a determining unit that determines whether the authentication data read by the reading unit is from the activity amount meter or from the IC card.

[26] In the image forming apparatus according to [25], the display unit may display a different option according to a result of the determination by the determining result.

[27] An image forming method includes: reading data stored in an activity amount meter; forming an image on a recording medium; displaying a plurality of options to be selected such that a use instruction of a function is received; sending the data stored in the activity amount meter and read; and receiving the use instruction in the displaying even in the sending of the data stored in the activity amount meter and read.

[28] An image forming method includes: reading data stored in an activity amount meter; forming an image on a recording medium; displaying a plurality of options to be selected such that a use instruction of a function is received, the plurality of options including an output option for outputting processed data obtained by processing the data stored in the activity amount meter and read; and sending the data stored in the activity amount meter and read.

[29] An image forming method includes: reading data including authentication data stored in an activity amount meter or an IC card; forming an image on a recording medium; and performing control to allow the data stored in the activity amount meter and read to be sent in a case where authentication is performed by reading the authentication data stored in the activity amount meter by the reading, and to allow the image to be formed in a case where authentication is performed by reading the authentication data stored in the IC card by the reading.

[30] A non-transitory computer readable medium storing a program causing a computer to execute a process, the process including: reading data stored in an activity amount meter; forming an image on a recording medium; displaying a plurality of options to be selected such that a use instruction of a function is received; sending the data stored in the activity amount meter and read; and receiving the use instruction in the displaying even in the sending of the data stored in the activity amount meter and read.

[31] A non-transitory computer readable medium storing a program causing a computer to execute a process, the process including: reading data stored in an activity amount meter; forming an image on a recording medium; displaying a plurality of options to be selected such that a use instruction of a function is received, the plurality of options including an output option for outputting processed data obtained by processing the data stored in the activity amount meter and read; and sending the data stored in the activity amount meter and read.

[32] A non-transitory computer readable medium storing a program for executing a computer, including: reading data including authentication data stored in an activity amount meter or an IC card; forming an image on a recording medium; and performing control to allow the data stored in the activity amount meter and read to be sent in a case where authentication is performed by reading the authentication data stored in the activity amount meter by the reading, and to allow the image to be formed in a case where authentication is performed by reading the authentication data stored in the IC card by the reading.

[33] An activity amount meter system includes: the image forming apparatus according to [1]; and a server that receives and accumulates data from the image forming apparatus, the data being read from the activity amount meter.

[34] An activity amount meter system includes: the image forming apparatus according to [13]; and a server that receives and accumulates data from the image forming apparatus, the data being read from the activity amount meter.

[35] An activity amount meter system includes: the image forming apparatus according to [18]; and a server that receives and accumulates data from the image forming apparatus, the data being read from the activity amount meter.

What is claimed is:

1. An image forming apparatus comprising:
at least one of a printer that forms an image on a recording medium and a scanner that reads an image, the at least one of the printer and the scanner further comprising:
a reader that reads data including physical activity data stored in an activity amount meter, wherein the physical activity data comprises at least one of acceleration data, a number of steps taken by a person, an amount of energy expended by the person, or an exercise quantity of the person;
a display that displays an option to be selected such that the display receives a use instruction of a function corresponding to the option that is selected; and
a processor configured to receive the physical activity data from the reader, and
send the physical activity data stored in the activity amount meter and read by the reader to an external electronic apparatus,
wherein the display is configured to display the option and receive the use instruction
even when the processor is sending the physical activity data stored in the activity amount meter and read by the reader, wherein first authentication data is included in the data read from the activity amount meter, and the processor determines with the first authentication data whether a user is allowed to execute at least one of the printer and the scanner, and wherein second authentication data is further included in the data read from the activity amount meter, the processor determines with the second authentication data whether the processor is allowed to send the data, and in a case where it is determined that the processor is allowed to send the data, regardless of a presence or an absence of reception of the use instruction of the function by the display, the processor sends data determined in advance among the data stored in the activity amount meter.

2. The image forming apparatus according to claim 1, wherein
the display displays an option for displaying a sending state of the data stored in the activity amount meter and read by the reader.

3. The image forming apparatus according to claim 1, wherein
in a case where sending of the data stored in the activity amount meter and read by the reader is completed, the display displays an indication that the sending is completed when displaying any screen.

4. The image forming apparatus according to claim 1, wherein
the reader is configured to read data stored in an IC card in addition to the data stored in the activity amount meter.

5. The image forming apparatus according to claim 4, comprising the printer, wherein
third authentication data is included in the data read from the IC card, and
the processor determines with the third authentication data whether a user is allowed to control the printer.

6. The image forming apparatus according to claim 5, wherein the second authentication data read from the activity amount meter and third authentication data read from the IC card are associated with each other, and
in a case where the authentication is performed based on the third authentication data stored in the IC card, the display displays an option for outputting processed data obtained by processing the data stored in the activity amount meter and read by the reader.

7. The image forming apparatus according to claim 4, wherein the processor is further configured to determine whether authentication data read by the reader is from the activity amount meter or from the IC card.

8. The image forming apparatus according to claim 7, wherein
the display displays a different option based on a result of the determination by the processor.

9. An activity amount meter system, comprising:
the image forming apparatus according to claim 1; and
a server that receives and accumulates data from the image forming apparatus, the data being read from the activity amount meter,
wherein the external electronic apparatus is the server.

10. The image forming apparatus according to claim 1, wherein the second authentication data is generated based on the first authentication data.

11. The image forming apparatus according to claim 1, wherein the first authentication data and the second authentication data are different from each other.

12. An image forming apparatus comprising:
a printer that forms an image on a recording medium, the printer further comprising:
a reader that reads data including physical activity data stored in an activity amount meter, wherein the physical activity data comprises at least one of acceleration data, a number of steps taken by a person, an amount of energy expended by the person, or an exercise quantity of the person; a display that displays an option to be selected such that the display receives a use instruction of a function corresponding to the option that is selected; and
a processor that sends the physical activity data stored in the activity amount meter and read by the reader to an external electronic apparatus,
wherein the display displays an output option for outputting processed data obtained by processing the physical activity data stored in the activity amount meter and read by the reader,
wherein first authentication data is included in the data read from the activity amount meter, and the processor determines with the first authentication data whether a user is allowed to execute the printer, and
wherein second authentication data is further included in the data read from the activity amount meter, the processor determines with the second authentication data whether the processor is allowed to send the data, and in a case where it is determined that the processor is allowed to send the data, regardless of a presence or an absence of reception of the use instruction of the function by the display, the processor sends data determined in advance among the data stored in the activity amount meter.

13. The image forming apparatus according to claim 12, wherein the external electronic apparatus is a server, and the data stored in the activity amount meter and read by the reader is processed by the server.

14. An activity amount meter system, comprising:
the image forming apparatus according to claim 12; and
a server that receives and accumulates data from the image forming apparatus, the data being read from the activity amount meter,
wherein the external electronic apparatus is the server.

15. An image forming apparatus comprising:
a reader that reads data including authentication data from an activity amount meter and an IC card, and physical activity data of a user comprising at least one of acceleration data, a number of steps taken by a person, an amount of energy expended by the person, or an exercise quantity of the person, stored in the activity amount meter, wherein the authentication data includes a first authentication data and a second authentication data;
a printer that forms an image on a recording medium; and
a processor that performs control to allow the physical activity data stored in the activity amount meter and read by the reader to be sent to an external electronic apparatus in a case where authentication is performed by reading the second authentication data stored in the activity amount meter by the reader, and to allow the image to be formed by the printer in a case where authentication is performed by reading the first authentication data stored in the IC card by the reader.

16. An activity amount meter system, comprising:
the image forming apparatus according to claim 15; and
a server that receives and accumulates data from the image forming apparatus, the data being read from the activity amount meter,
wherein the external electronic apparatus is the server.

17. A non-transitory computer readable medium storing a program causing a printer to execute a process, the process comprising:
- controlling the printer to read authentication data and physical activity data of a user comprising at least one of acceleration data, a number of steps taken by a person, an amount of energy expended by the person, or an exercise quantity of the person stored in an activity amount meter;
- controlling the printer to form an image on a recording medium;
- displaying, via the printer, a plurality of options to be selected such that a use instruction of a function is received;
- controlling a processor included in the printer to send the physical activity data that is stored in the activity amount meter and read to an external electronic apparatus; and wherein the sending occurs while the use instruction is received,
- wherein first authentication data is included in the data read from the activity amount meter, and the processor determines with the first authentication data whether a user is allowed to execute the printer, and
- wherein second authentication data is further included in the data read from the activity amount meter, the processor determines with the second authentication data whether the processor is allowed to send the data, and in a case where it is determined that the processor is allowed to send the data, regardless of a presence or an absence of reception of the use instruction of the function by the display, the processor sends data determined in advance among the data stored in the activity amount meter.

18. A non-transitory computer readable medium storing a program causing a printer to execute a process, the process comprising:
- controlling the printer to read authentication data and physical activity data of a user comprising at least one of acceleration data, a number of steps taken by a person, an amount of energy expended by the person, or an exercise quantity of the person stored in an activity amount meter;
- controlling the printer to form an image on a recording medium;
- displaying, via the printer, a plurality of options to be selected such that a use instruction of a function corresponding to one of the options is received, wherein the plurality of options includes an output option for outputting processed data obtained by processing the physical activity data that is stored in the activity amount meter and read; and
- controlling a processor included in the printer to send the physical activity data that is stored in the activity amount meter and read to an external electronic apparatus,
- wherein first authentication data is included in the authentication data read from the activity amount meter, and the processor determines with the first authentication data whether a user is allowed to execute the printer, and wherein second authentication data is further included in the authentication data read from the activity amount meter, the processor determines with the second authentication data whether the processor is allowed to send the data, and in a case where it is determined that the processor is allowed to send the data, regardless of a presence or an absence of reception of the use instruction of the function by the display, the processor sends data determined in advance among the data stored in the activity amount meter.

19. A non-transitory computer readable medium storing a program causing a computer to execute a process, the process comprising: reading data including authentication data stored in an activity amount meter or an IC card, and physical activity data of a user comprising at least one of acceleration data, a number of steps taken by a person, an amount of energy expended by the person, or an exercise quantity of the person, stored in the activity amount meter, wherein the authentication data includes a first authentication data and a second authentication data; controlling a printer to form an image on a recording medium; and performing control to allow the physical activity data stored in the activity amount meter and read to be sent to an external electronic apparatus in a case where authentication is performed by reading the second authentication data stored in the activity amount meter by the reading, and to allow the image to be formed in a case where authentication is performed by reading the first authentication data stored in the IC card by the reading.

* * * * *